(12) United States Patent
Kondoh et al.

(10) Patent No.: US 7,787,077 B2
(45) Date of Patent: Aug. 31, 2010

(54) LIQUID CRYSTAL DISPLAY APPARATUS

(75) Inventors: Shinya Kondoh, Nishitokyo (JP); Mie Ohara, Tokorozawa (JP)

(73) Assignee: Citizen Holdings Co., Ltd, Tokyo (JP)

( * ) Notice: Subject to any disclaimer, the term of this patent is extended or adjusted under 35 U.S.C. 154(b) by 96 days.

(21) Appl. No.: 10/591,985

(22) PCT Filed: Jan. 18, 2006

(86) PCT No.: PCT/JP2006/301076

§ 371 (c)(1),
(2), (4) Date: Sep. 7, 2006

(87) PCT Pub. No.: WO2006/078044

PCT Pub. Date: Jul. 27, 2006

(65) Prior Publication Data

US 2007/0206131 A1   Sep. 6, 2007

(30) Foreign Application Priority Data

Jan. 18, 2005   (JP) .............................. 2005-010180

(51) Int. Cl.
*G02F 1/1339* (2006.01)
(52) U.S. Cl. ....................................................... 349/96
(58) Field of Classification Search ........................ None
See application file for complete search history.

(56) References Cited

U.S. PATENT DOCUMENTS 6,008,871 A   12/1999   Okumura (Continued)

FOREIGN PATENT DOCUMENTS

CN   1188902 A   7/1998

(Continued)

OTHER PUBLICATIONS

Notification of the First Office Action for Application No. 200680000127.7, Patent Office of the People's Republic of China, dated Jun. 6, 2008.

(Continued)

*Primary Examiner*—Sung H Pak
(74) *Attorney, Agent, or Firm*—Finnegan, Henderson, Farabow, Garrett & Dunner, L.L.P.

(57) ABSTRACT

The liquid crystal display apparatus according to the present invention includes a first substrate, a second substrate, a reflective polarizer, mounted on the first substrate and having a first transmission axis and a first reflection axis at right angles to each other, for transmitting linearly polarized light vibrating in a plane parallel to the first transmission axis and for reflecting linearly polarized light vibrating in a plane parallel to the first reflection axis, a polarizer, mounted on the second substrate and having a second transmission axis, for transmitting linearly polarized light vibrating in a plane parallel to the second transmission axis, and a liquid crystal layer, provided between the first and second substrates, having a first mode which causes the direction of polarization of incident light to change by utilizing birefringence and a second mode which does not utilize birefringence and therefore does not cause the direction of polarization of incident light to change, wherein a display state is switched between a bright display state and a dark display state by applying a voltage to the liquid crystal layer, and the bright display state is produced by driving the liquid crystal layer in the second mode.

13 Claims, 9 Drawing Sheets

U.S. PATENT DOCUMENTS

2002/0149727 A1    10/2002  Wang
2005/0117095 A1*    6/2005  Ma ........................... 349/113
2005/0248698 A1*   11/2005  Okamoto et al. .............. 349/98

FOREIGN PATENT DOCUMENTS

| | | |
|---|---|---|
| CN | 1380580 | 11/2002 |
| JP | 11-109337 | 4/1999 |
| JP | 11-212073 | 8/1999 |
| JP | 2001-131681 | 5/2000 |
| JP | 2000-330107 | 11/2000 |
| JP | 2001-222005 | 8/2001 |
| WO | WO 99/21051 | 4/1999 |

OTHER PUBLICATIONS

Manual for Liquid Crystal, Aug. 1992, p. 376-385.

* cited by examiner

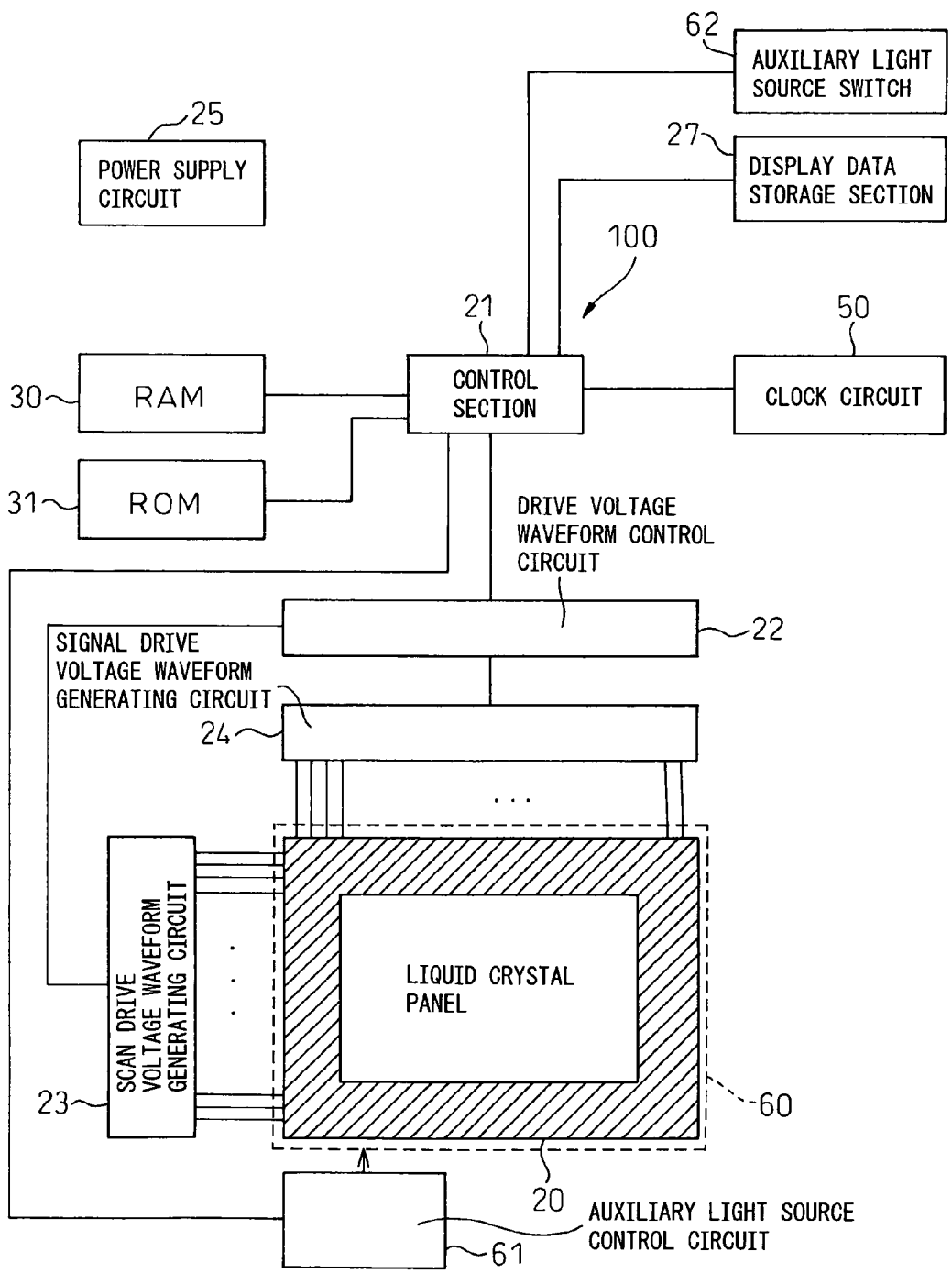

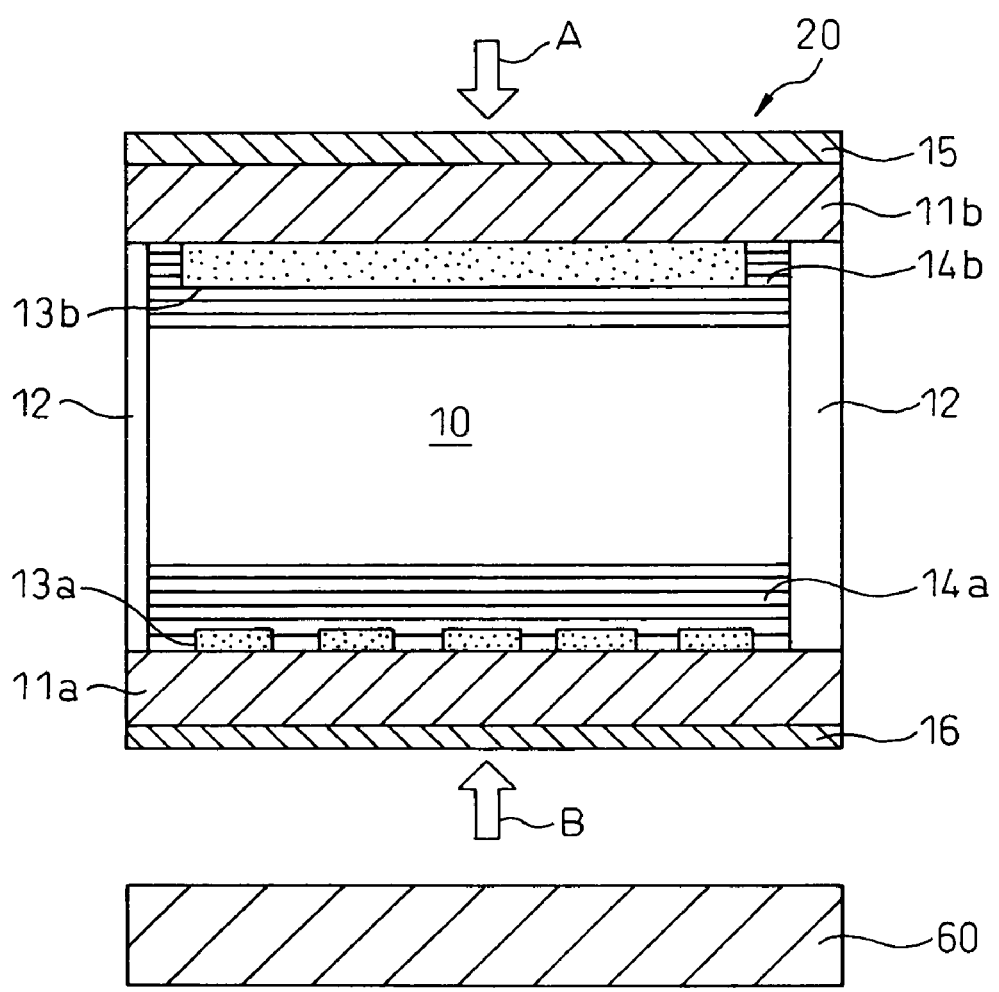

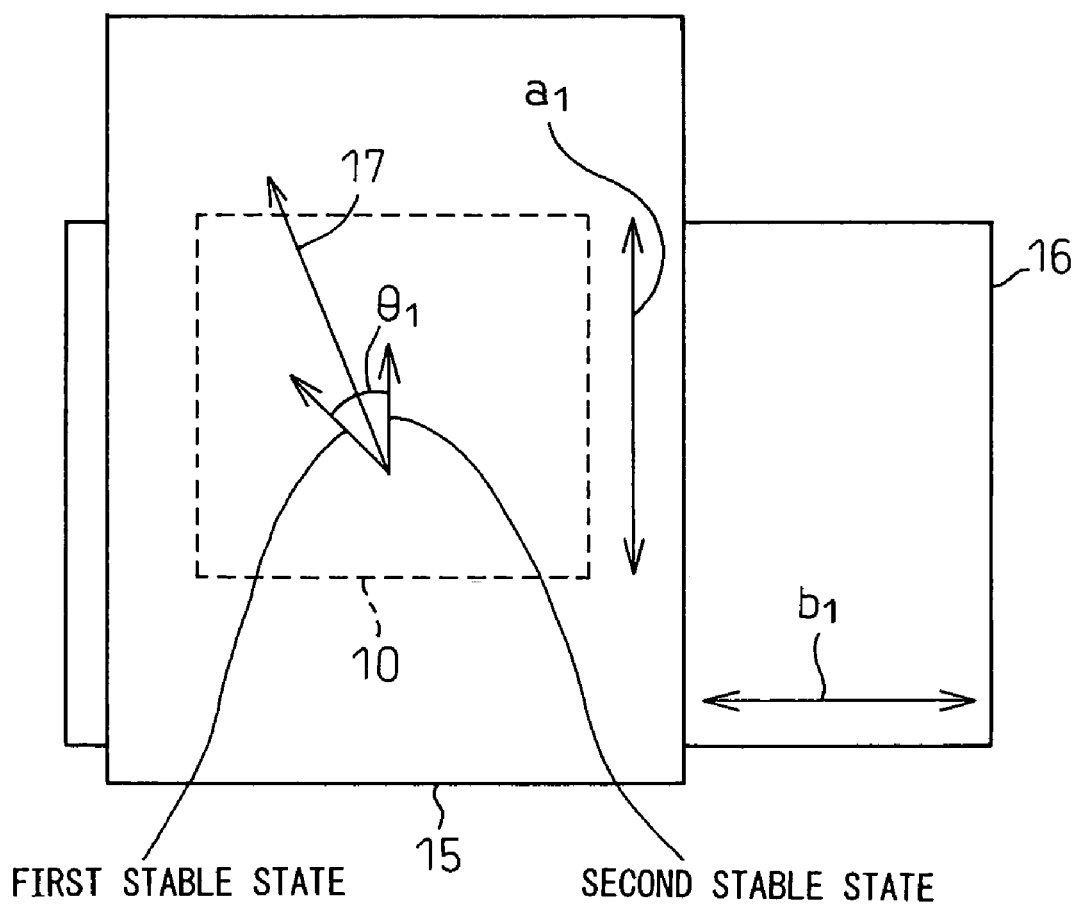

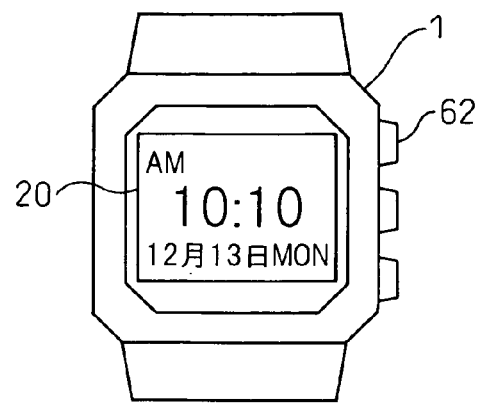
Fig.5(a)
Fig.5(b)
Fig.6(a)
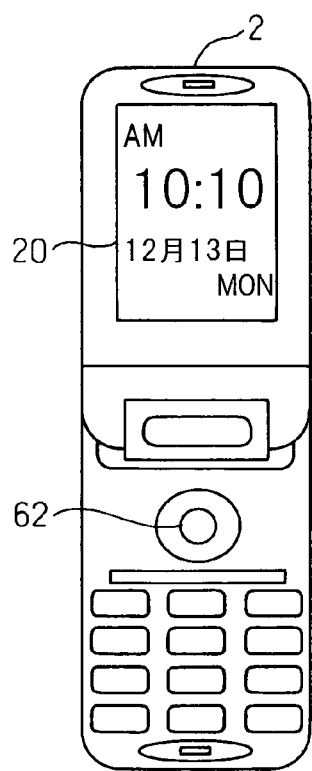
Fig.6(b)

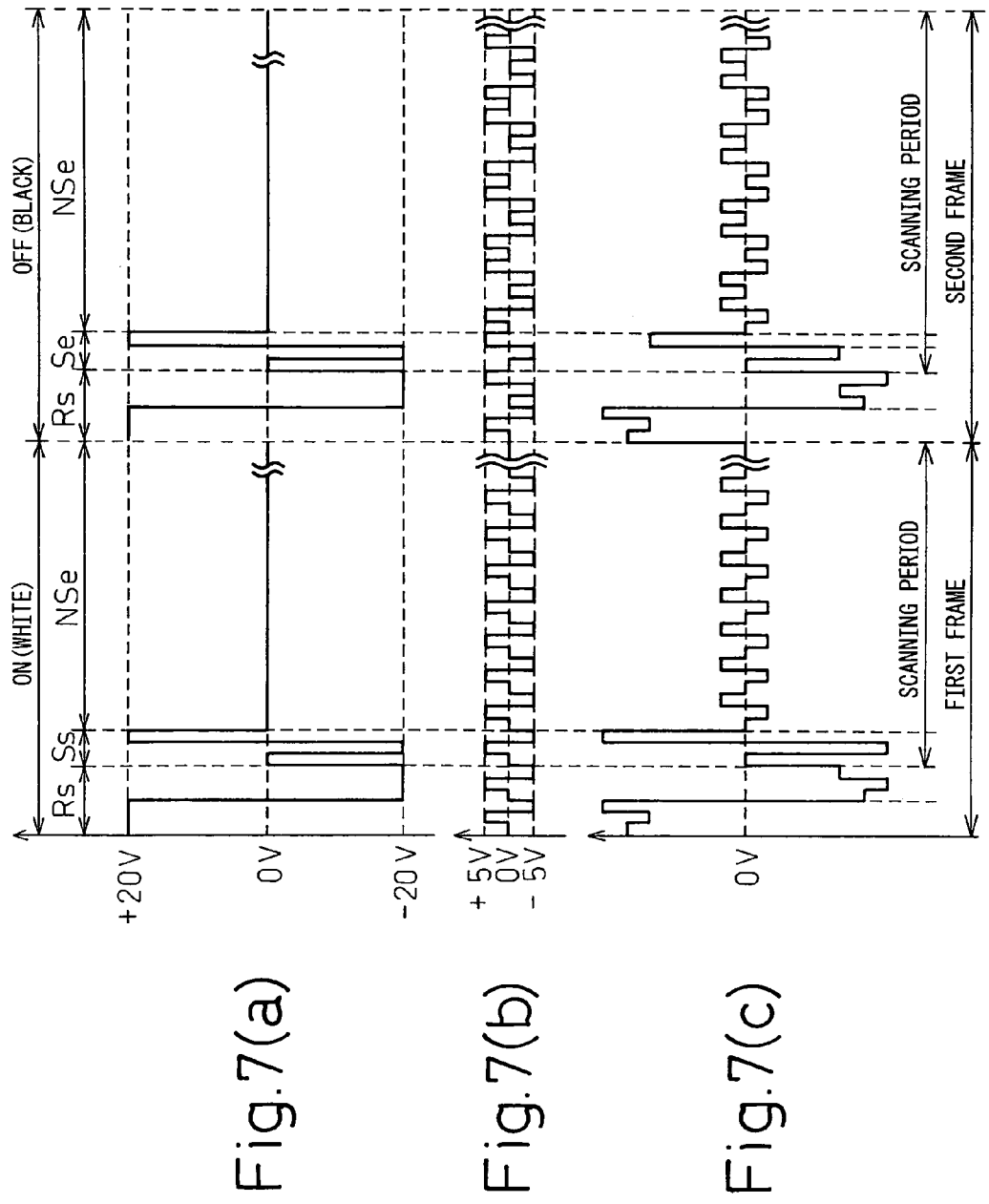

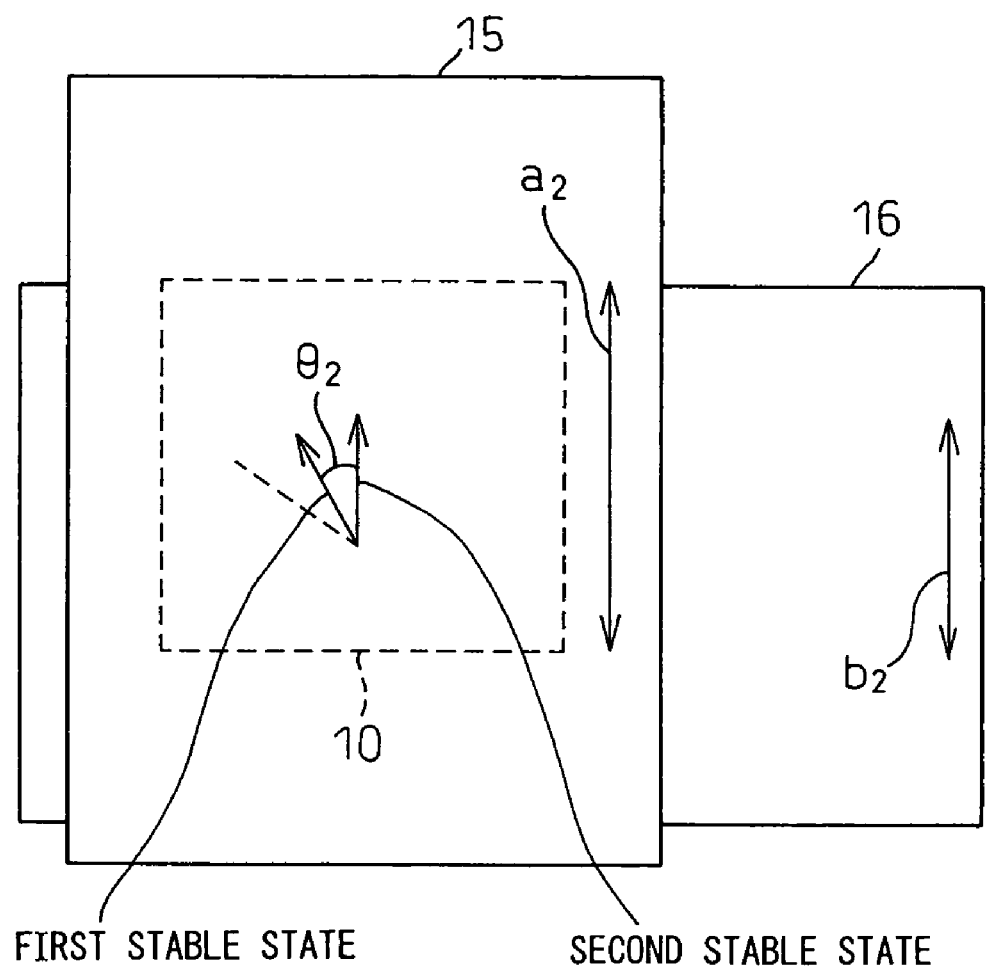

LIQUID CRYSTAL DISPLAY APPARATUS

FIELD OF THE INVENTION

The present invention relates to a liquid crystal display apparatus and, more particularly, to a liquid crystal display apparatus that can display a background in a bright state without utilizing birefringence.

BACKGROUND OF THE INVENTION

A memory liquid crystal, which is capable of exhibiting a plurality of optical states, has a characteristic (a memory characteristic) such that it continues to retain a particular state even if a voltage is not applied to it. When such a memory liquid crystal is used in a liquid crystal display apparatus, the apparatus can be controlled to continue to display a particular image without requiring application of a voltage. In a display panel using a memory liquid crystal such as a ferroelectric liquid crystal, it is know to utilize the memory characteristic and perform control in such a manner as to drive scanning electrodes only for portions where the display needs to be updated but not to drive scanning electrodes for portions where the display need not be updated (for an example, see patent document 1).

It is also known to provide a transflective liquid crystal display apparatus that can operate in both reflective and transmissive display modes (for an example, see patent document 2). The transflective liquid crystal display apparatus includes a pair of substrates provided, therebetween, with a twisted nematic liquid crystal (TN liquid crystal) which operates to rotate the plane of polarization of incident light through 90 degrees, a polarizer mounted on one of the substrates, a reflective polarizer, having a reflection axis and a transmission axis, mounted on the other substrate, a semi-transmitting absorbing layer provided on the outer side of the reflective polarizer, and an auxiliary light source mounted on the outer side of the semi-transmitting absorbing layer.

In the transflective liquid crystal display apparatus, when the polarizers are arranged so that a dark display state is produced in an ON state in which a voltage of H level is applied to the TN liquid crystal (the TN liquid crystal is in the transmissive state) in the reflective display mode effected with the auxiliary light source turned off, then a bright display state will be produced in the ON state in which the voltage of H level is applied to the TN liquid crystal (the TN liquid crystal is in the transmissive state) when the transmissive display mode is effected by turning on the auxiliary light source. This is because, when the TN liquid crystal is set in the transmissive state with the auxiliary light source turned off, the display appears dark as the surface color of the turned off auxiliary light source is observed by the viewer, while when the TN liquid crystal is set in the transmissive state with the auxiliary light source turned on, the display appears bright as the light from the auxiliary light source is observed by the viewer. That is, the problem is that even if the voltage of the same level is applied to the TN liquid crystal, the dark display becomes reversed depending on the ON/OFF of the auxiliary light source. Therefore, to prevent the reversal of the dark display, it has been practiced in the prior art to switch the voltage to be applied to the TN liquid crystal (for example, from H level to L level).

Patent document 1: Japanese Unexamined Patent Publication No. H02-131286 (pages 11 and 12 and FIG. 12)

Patent document 2: Japanese Patent Publication No. 3485541

SUMMARY OF THE INVENTION

However, in the transflective liquid crystal display apparatus, no suggestions have been made as to how the polarizer, the reflective polarizer, and the liquid crystal molecules in the liquid crystal should be oriented or aligned, according to purpose.

Accordingly, it is an object of the present invention to provide a transflective liquid crystal display apparatus in which the polarizer, the reflective polarizer, and the liquid crystal molecules in the liquid crystal are oriented or aligned properly.

It is another object of the present invention to provide a liquid crystal display apparatus that can produce a bright display state without utilizing birefringence.

A liquid crystal display apparatus according to the present invention includes a first substrate, a second substrate, a reflective polarizer, mounted on the first substrate and having a first transmission axis and a first reflection axis at right angles to each other, for transmitting linearly polarized light vibrating in a plane parallel to the first transmission axis and for reflecting linearly polarized light vibrating in a plane parallel to the first reflection axis, a polarizer, mounted on the second substrate and having a second transmission axis, for transmitting linearly polarized light vibrating in a plane parallel to the second transmission axis, and a liquid crystal layer provided between the first and second substrates, and having a first mode which causes the direction of polarization of incident light to change by utilizing birefringence and a second mode which does not utilize birefringence and therefore does not cause the direction of polarization of incident light to change, wherein display state is switched between a bright display state and a dark display state by applying a voltage to the liquid crystal layer, and the bright display state is produced by driving the liquid crystal layer in the second mode.

Preferably, in the liquid crystal display apparatus according to the present invention, the bright display state is produced by causing ambient light entering the liquid crystal layer through the second transmission axis of the polarizer to be reflected at the reflective polarizer and by allowing the reflected light to return through the liquid crystal layer and emerge from the polarizer.

Further preferably, in the liquid crystal display apparatus according to the present invention, the first transmission axis and the second transmission axis are arranged substantially at right angles to each other.

Preferably, in the liquid crystal display apparatus according to the present invention, the liquid crystal layer maintains one or the other of first and second stable states in the absence of an applied voltage, and one or the other of the first and second stable states is set as the second mode. That is, the liquid crystal display apparatus according to the present invention is constructed using the so-called memory liquid crystal.

Further preferably, in the liquid crystal display apparatus according to the present invention, in the second stable state, liquid crystal molecules are aligned in a direction substantially parallel to the second transmission axis.

Also preferably, in the liquid crystal display apparatus according to the present invention, in the first stable state, the liquid crystal molecules are aligned in a direction tilted at approximately 45 degrees from the direction in which the liquid crystal molecules are aligned in the second stable state.

Preferably, in the liquid crystal display apparatus according to the present invention, the liquid crystal layer is a vertically aligned liquid crystal layer, and has a first state in which the liquid crystal molecules are aligned substantially vertically between the first and second substrates and a second state in which the liquid crystal molecules are tilted at a prescribed angle with respect to the second transmission axis, wherein the first state is set as the second mode.

Preferably, the liquid crystal display apparatus according to the present invention further comprises an auxiliary light source mounted outside the reflective polarizer, and the liquid crystal layer is driven in the second mode with the auxiliary light source turned off.

Preferably, the liquid crystal display apparatus according to the present invention further comprises an auxiliary light source mounted outside the reflective polarizer, and the liquid crystal layer is driven in the second mode with the auxiliary light source turned on.

Preferably, in the liquid crystal display apparatus according to the present invention, the bright display state is produced by allowing light emitted from the auxiliary light source and entering the liquid crystal layer through the first transmission axis of the reflective polarizer to pass through the second transmission axis of the polarizer and emerge on a viewer side thereof.

Preferably, in the liquid crystal display apparatus according to the present invention, the first transmission axis and the second transmission axis are arranged substantially parallel to each other.

Preferably, the liquid crystal display apparatus according to the present invention further comprises: an auxiliary light source mounted outside the reflective polarizer; and a light absorbing layer, disposed between the reflective polarizer and the auxiliary light source, for absorbing light in a certain spectral region. With this arrangement, when the memory liquid crystal is set in the transmissive mode with the auxiliary light source turned off, the surface color of the auxiliary light source to be observed on the memory liquid crystal display can be displayed even more darkly.

Preferably, the liquid crystal display apparatus according to the present invention further comprises: an auxiliary light source mounted outside the reflective polarizer; and a light absorbing layer, disposed between the reflective polarizer and the auxiliary light source, for absorbing a portion of light in a visible region. With this arrangement, when the memory liquid crystal is set in the transmissive mode with the auxiliary light source turned off, the surface color of the auxiliary light source to be observed on the memory liquid crystal display can be displayed even more darkly.

Preferably, the liquid crystal display apparatus according to the present invention further comprises an auxiliary light source mounted outside the reflective polarizer, and the auxiliary light source is provided with a reflective layer for reflecting a portion of light in a visible region.

Preferably, in the liquid crystal display apparatus according to the present invention, the liquid crystal layer is a vertically aligned liquid crystal layer, and has a first state in which the liquid crystal molecules are aligned substantially vertically between the first and second substrates and a second state in which the liquid crystal molecules are tilted at a prescribed angle with respect to the second transmission axis. That is, the liquid crystal display apparatus according to the present invention is constructed using the so-called vertically aligned liquid crystal.

Preferably, in the liquid crystal display apparatus according to the present invention, when the liquid crystal layer is maintained in the first state, the liquid crystal layer is set in the second mode.

According to the present invention, as the white display state is produced without using the birefringence of the liquid crystal, it becomes possible to cleanly display white. This is particularly effective when the bright display area is large (that is, when the background color is set to white). If the arrangement is made to produce a black display state without using the birefringence of the liquid crystal, the black can be displayed cleanly, but since unevenness is not noticeable in the dark display state because of its nature, the effect is not so large as in the case of the white display state.

According to the present invention, in the transflective liquid crystal display apparatus using the memory liquid crystal, a dark display state closer to black can be achieved in applications where the display is normally produced in the reflective mode that does not use the auxiliary light source.

Further, according to the present invention, in the transflective liquid crystal display apparatus using the memory liquid crystal, a dark display state closer to black can be achieved in applications where the display is normally produced in the transmissive mode by using the auxiliary light source.

Furthermore, according to the present invention, in the transflective liquid crystal display apparatus using the memory liquid crystal, a good bright display state free from unevenness can be achieved in applications where the display is normally produced in the reflective mode that does not use the auxiliary light source.

DESCRIPTION OF THE DRAWINGS

FIG. 1 is a block diagram showing the configuration of a liquid crystal display apparatus according to the present invention.

FIG. 2 is a diagram showing an example of the structure of a liquid crystal panel according to the present invention.

FIG. 3 is a diagram showing the relationship between a polarizer and a reflective polarizer in the liquid crystal panel according to a first embodiment.

FIG. 4(b) is a diagram showing the relationship between the transmittance of light and the voltage applied to the liquid crystal panel according to the first embodiment for the case in which the auxiliary light source is turned on.

FIG. 5(a) is a diagram showing a display example when the liquid crystal panel according to the present invention is used in a wrist watch, and FIG. 5(b) is a diagram showing the case where the display is reversed.

FIG. 6(a) is a diagram showing a display example when the liquid crystal panel according to the present invention is used in a mobilephone, and FIG. 6(b) is a diagram showing the case where the display is reversed.

FIG. 7(a) is a diagram showing one example of a scanning voltage waveform applied to a scanning electrode 13a, FIG. 7(b) is a diagram showing one example of a signal voltage waveform applied to a signal electrode 13b, and FIG. 7(c) is a diagram showing a sum voltage waveform representing the sum of (a) and (b).

FIG. 8 is a diagram showing the relationship between the polarizer and the reflective polarizer in the liquid crystal panel according to a second embodiment.

FIG. 9(b) is a diagram showing the relationship between the transmittance of light and the voltage applied to the liquid crystal panel according to the second embodiment for the case in which the auxiliary light source is turned on.

DETAILED DESCRIPTION OF THE PREFERRED EMBODIMENT

Figure 4A:
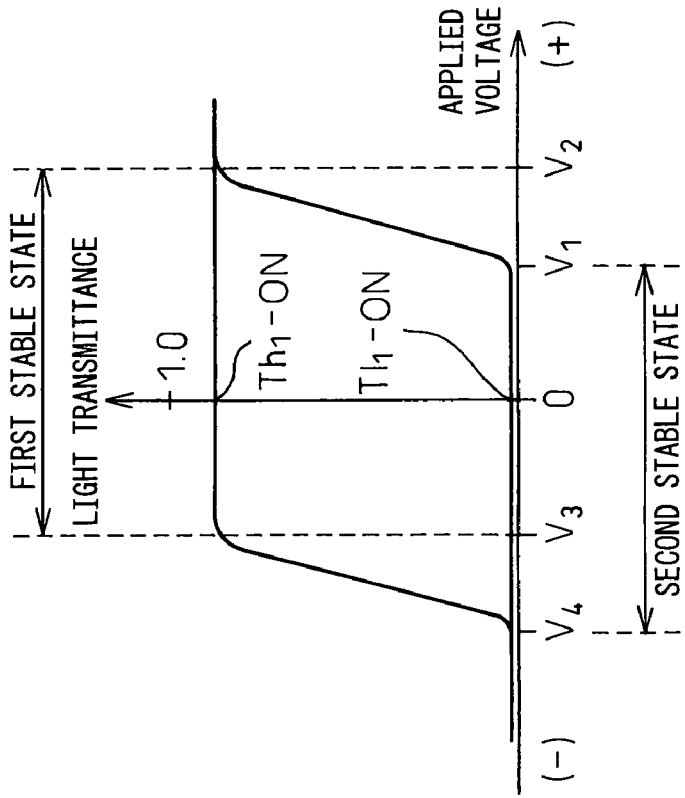
FIG. 4(a) is a diagram showing the relationship between the transmittance of light and the voltage applied to the liquid crystal panel according to the first embodiment for the case in which an auxiliary light source is turned off.

A liquid crystal display apparatus 100 according to the present invention will be described below with reference to the drawings.

FIG. 1 is a block diagram showing the basic configuration of the liquid crystal display apparatus 100 which is common to the several embodiments described herein.

The liquid crystal display apparatus 100 includes a liquid crystal panel 20, a control section 21, a drive voltage waveform control circuit 22, a scan drive voltage waveform generating circuit 23 for applying a voltage waveform to scanning electrodes 13a arranged within the liquid crystal panel 20, a signal drive voltage waveform generating circuit 24 for applying a voltage waveform to signal electrodes 13b arranged within the liquid crystal panel 20, a power supply section 25 containing a power supply such as a solar battery or a secondary battery, a display data storage section 27, a RAM 30, a ROM 31, and a clock circuit 50.

Further, the liquid crystal display apparatus 100 includes an auxiliary light source 60 mounted behind the liquid crystal panel 20, an auxiliary light source control circuit 61 for controlling the on/off operation of the auxiliary light source 60, and an auxiliary light source switch 62 for allowing the user to set the auxiliary light source 60 on and off. Though not explicitly shown in FIG. 1, each component element of the liquid crystal display apparatus 100 is configured to be able to receive power from the power supply section 25.

The control section 21, in accordance with a program pre-stored in the RAM 30 or ROM 31, creates display data using time information, etc. received from the clock circuit 50, stores the data in the display data storage section 27, and supplies a control signal to the drive voltage waveform control circuit 22 so that the display data corresponding to the time information is presented for display on the liquid crystal panel 20.

Here, when the user turns on the auxiliary light source switch 62 to view the liquid crystal display apparatus 100, for example, in a low ambient light environment, the control section 21 controls the auxiliary light source control circuit 61 which thereupon turns on the auxiliary light source 60.

Further, upon detecting the ON state of the auxiliary light source switch 62, the control section 21 controls the drive voltage waveform control circuit 22 to reverse the polarity of a ferroelectric liquid crystal 10, thereby performing control so that the display on the liquid crystal panel 20 will not be reversed by the on/off operation of the auxiliary light source 60.

A first embodiment will be described.

FIG. 2 shows a cross-sectional view of the liquid crystal panel 20 according to the first embodiment, along with the auxiliary light source 60.

The liquid crystal panel 20 according to the first embodiment includes a first transparent glass substrate 11a, a second transparent glass substrate 11b, scanning electrodes 13a formed on the first transparent glass substrate 11a, signal electrodes 13b formed on the second transparent glass substrate 11b, a polymeric alignment film 14a deposited over the scanning electrodes 13a and treated by rubbing, a polymeric alignment film 14b deposited over the signal electrodes 13b and treated by rubbing, a sealing member 12, a ferroelectric liquid crystal 10 provided between the first and second transparent substrates 11a and 11b and sealed by the sealing member 12, a reflective polarizer 16 provided on the outer side of the first transparent substrate 11a, and a polarizer 15 provided on the outer side of the second transparent substrate 11b.

Here, "FELIX 501", manufactured by Clariant, is used as the ferroelectric liquid crystal 10. The ferroelectric liquid crystal 10 provided between the first and second transparent glass substrates 11a and 11b is about 1.7 μm in thickness.

The reflective polarizer 16 is formed from a multilayer film of a polyester resin or the like, and has a transmission axis and a reflection axis oriented at right angles to each other. The reflective polarizer 16 has the function of transmitting linearly polarized light vibrating in a plane parallel to the transmission axis and reflecting linearly polarized light vibrating in a plane parallel to the reflection axis.

In FIG. 2, arrow A indicates ambient light incident on the liquid crystal panel 20 from the outside, and arrow B shows light incident on the liquid crystal panel 20 from the auxiliary light source 60.

Because of its low power consumption and thin construction, a backlight using organic EL cells as light-emitting devices is employed as the auxiliary light source 60 which is disposed below the reflective polarizer 16 of the liquid crystal panel 20. The auxiliary light source may alternatively be constructed from other kinds of light-emitting devices.

For convenience of illustration, only five scanning electrodes 13a are shown in FIG. 2 but, actually, in the present embodiment, 40 scanning electrodes 13a are formed by patterning a transparent conductive film over the entire area of the liquid crystal panel 20. Further, 50 signal electrodes 13b are formed by patterning a transparent conductive film over the entire area of the liquid crystal panel 20 in such a manner as to intersect at right angles with the scanning electrodes 13a. Accordingly, the liquid crystal panel 20 has pixels (a total of 2000 pixels) each located at an intersection between the scanning electrodes 13a and the signal electrodes 13b.

FIG. 3 shows the arrangement of the polarizer 15 and the reflective polarizer 16 in the liquid crystal panel 20 according to the first embodiment.

As shown in FIG. 3, the transmission axis ($a_1$) of the polarizer 15 is oriented substantially at right angles to the transmission axis ($b_1$) of the reflective polarizer 16. The ferroelectric liquid crystal has two stable states, the first stable state and the second stable state, in the absence of an applied voltage. In FIG. 3, the ferroelectric liquid crystal 10 is arranged so that, in the second stable state, the long axes of the liquid crystal molecules are aligned in parallel to the transmission axis ($a_1$) of the polarizer 15. Here, the long axes of the liquid crystal molecules in either the first or the second stable state, whichever is appropriate, may be made to align in parallel to the transmission axis ($a_1$). Further, as shown in FIG. 3, in the first stable state of the ferroelectric liquid crystal 10, the long axis of each liquid crystal molecule is tilted, by a cone angle $\theta_1$, relative to the long axis of each liquid crystal molecule of the ferroelectric liquid crystal 10 in the second stable state; that is, the long axis rotates around a liquid crystal cone to a position different to that in the second stable state. In FIG. 3, arrow 17 indicates the alignment direction of the alignment film, which is exactly midway between the alignment direction of the first stable state and the alignment direction of the second stable state.

In the ferroelectric liquid crystal 10 according to the first embodiment, the cone angle ($\theta_1$) is chosen to be approximately 45°. This is because when the ferroelectric liquid crystal utilizes the birefringence, the relationship between the amount of light ($I_{in}$) incident on the ferroelectric liquid crystal and the amount of light ($I_{out}$) emerging from it is generally expressed by the following equation (1), and the amount of emergent light ($I_{out}$) becomes maximum when the cone angle ($\theta_1$) is 45°.

$$I_{out}=I_{in}\cdot\sin^2 2\theta\cdot\sin^2(R/\lambda) \quad (1)$$

where R designates the retardation, and λ denotes the wavelength of the light incident on the ferroelectric liquid crystal.

Here, even if the cone angle ($\theta_1$) is set to 45°, $I_{out}$ does not become equal to $I_{in}$ when birefringence is utilized, because attenuation occurs due to retardation.

FIG. 4 shows the relationship between the transmittance of light and the polarity of the voltage applied to the ferroelectric liquid crystal 10 in the liquid crystal panel 20 according to the first embodiment.

Figure 4B:
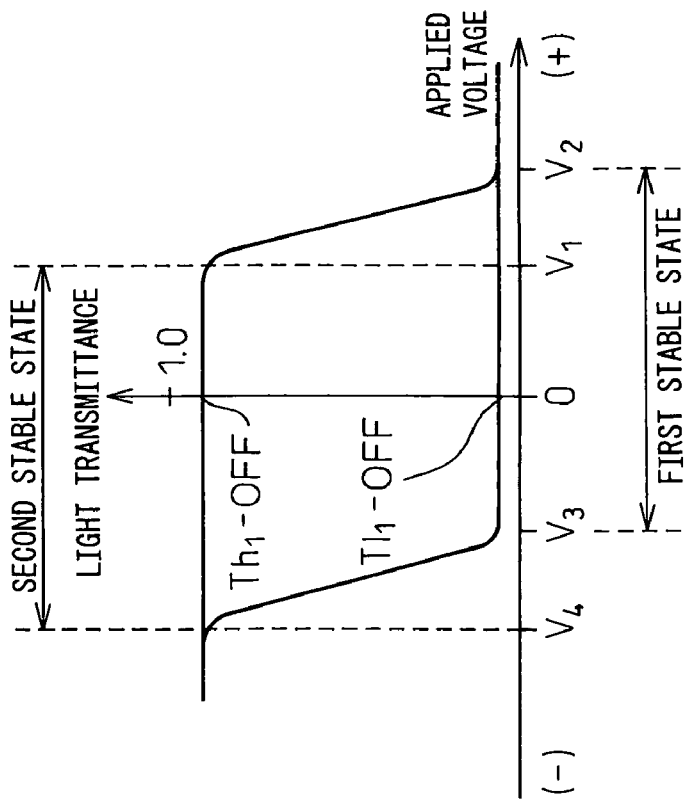

FIG. 4(a) shows the graph for the case in which the auxiliary light source 60 is turned off, while FIG. 4(b) shows the graph for the case in which the auxiliary light source 60 is turned on. In each graph, the horizontal axis represents the voltage (V) applied between the scanning electrode 13a and signal electrode 13b in the liquid crystal panel 20 with the scanning electrode 13a as the reference (that is, the voltage applied across the ferroelectric liquid crystal 10), and the vertical axis represents the transmittance of the liquid crystal panel 20.

Referring to FIG. 4(a), a description will be given for the case in which the auxiliary light source 60 is turned off.

As the liquid crystal molecules in the second stable state are aligned in parallel to the transmission axis ($a_1$), when the ferroelectric liquid crystal 10 is switched to the first stable state by reversing the polarity of the applied voltage, the orientation direction of the long axes of the liquid crystal molecules in the ferroelectric liquid crystal 10 becomes displaced from both the transmission axis ($a_1$) of the polarizer 15 and the transmission axis ($b_1$) of the reflective polarizer 16. That is, the orientation direction of the long axes of the liquid crystal molecules in the ferroelectric liquid crystal 10 is tilted at an angle $\theta_1$ (approximately 45°) relative to the transmission axis ($a_1$). Ambient light A vibrating in a plane parallel to the transmission axis ($a_1$) of the polarizer 15 enters the liquid crystal panel 20 where, due to the birefringence of the ferroelectric liquid crystal 10, the plane of vibration is rotated so as to become substantially parallel to the transmission axis ($b_1$) of the reflective polarizer 16; as a result, the light passes through the liquid crystal panel 20 (transmissive state) and is reflected by the surface of the auxiliary light source 60. Usually, the surface color of the auxiliary light source 60 is dark; accordingly, when the auxiliary light source 60 is turned off, in the first stable state the light passed through the liquid crystal panel 20 and returned by reflection appears dark on the liquid crystal panel 20 because the dark surface color of the auxiliary light source 60 is observed by the viewer. In FIG. 4(a), the transmittance at this time is indicated at $Tl_1$-OFF. The mode in which the polarization direction of the incident light is changed by using the birefringence will be referred to as a first mode. In the present embodiment, the apparatus operates in the first mode when the ferroelectric liquid crystal exhibits the first stable state.

When the ferroelectric liquid crystal 10 is switched to the second stable state by reversing the polarity of the applied voltage, the long axes of the liquid crystal molecules in the ferroelectric liquid crystal 10 align in parallel to the transmission axis ($a_1$) of the polarizer 15. In this state, the ferroelectric liquid crystal 10 allows the incident light to pass through. As the ambient light A vibrating in a plane parallel to the transmission axis ($a_1$) and entering the liquid crystal panel 20 has a plane of vibration substantially perpendicular to the transmission axis ($b_1$) of the reflective polarizer 16, the light is reflected by the reflection axis of the reflective polarizer 16 (reflective state). Accordingly, when the auxiliary light source 60 is turned off, in the second stable state the light passed through the liquid crystal panel 20 is reflected by the reflection axis of the reflective polarizer 16, producing a bright display on the liquid crystal panel 20. In FIG. 4(a), the transmittance at this time is indicated at $Th_1$-OFF. The mode that does not utilize the birefringence and therefore does not cause the polarization direction of the incident light to change will be referred to as a second mode. In the present embodiment, the apparatus operates in the second mode when the ferroelectric liquid crystal exhibits the second stable state.

As described above, in the case where the auxiliary light source 60 is turned off, when the voltage applied to the ferroelectric liquid crystal 10 is increased (above the voltage $V_1$ at which the transmittance begins to increase) to the voltage $V_2$ (positive threshold) at which the increase of the transmittance reaches saturation, the ferroelectric liquid crystal 10 thereafter maintains the first ferroelectric state even after the applied voltage is removed (that is, 0 V is applied), and thus the liquid crystal panel 20 maintains the dark display state. On the other hand, when the voltage applied to the ferroelectric liquid crystal 10 is decreased (below the voltage $V_3$ at which the transmittance begins to decrease) to the voltage $V_4$ (negative threshold) at which the decrease of the transmittance reaches saturation, the ferroelectric liquid crystal 10 thereafter maintains the second ferroelectric state even after the applied voltage is removed (that is, 0 V is applied) and, thus, the liquid crystal panel 20 maintains the bright display state.

Referring to FIG. 4(b), a description will be given for the case in which the auxiliary light source 60 is turned on.

When the ferroelectric liquid crystal 10 is switched to the first stable state by reversing the polarity of the applied voltage, the orientation direction of the long axes of the liquid crystal molecules in the ferroelectric liquid crystal 10 becomes displaced from both the transmission axis ($a_1$) of the polarizer 15 and the transmission axis ($b_1$) of the reflective polarizer 16. Light B emitted from the auxiliary light source 60 and vibrating in a plane parallel to the transmission axis ($b_1$) of the reflective polarizer 16 enters the liquid crystal panel 20 where, due to the birefringence of the ferroelectric liquid crystal 10, the plane of vibration is rotated so as to become substantially parallel to the transmission axis ($a_1$) of the polarizer 15; as a result, the light passes through the polarizer 15 (transmissive state) and is observed on the liquid crystal panel 20. Accordingly, when the auxiliary light source 60 is turned on, in the first stable state the light from the auxiliary light source 60 passes through the liquid crystal panel 20, producing a bright display on the liquid crystal panel 20. In FIG. 4(b), the transmittance at this time is indicated at $Th_1$-ON. The mode here is the first mode because the liquid crystal layer uses birefringence.

When the ferroelectric liquid crystal 10 is switched to the second stable state by reversing the polarity of the applied voltage, the long axes of the liquid crystal molecules in the ferroelectric liquid crystal 10 align in parallel to the transmission axis ($a_1$) of the polarizer 15. As the light B emitted from the auxiliary light source 60 and vibrating in a plane parallel to the transmission axis ($b_1$), thus entering the liquid crystal panel 20, has a plane of vibration perpendicular to the transmission axis ($a_1$), the light is absorbed by the polarizer 15 and, therefore, is not observed on the surface of the liquid crystal panel 20. Accordingly, when the auxiliary light source 60 is turned on, in the second stable state a dark display is produced on the liquid crystal panel 20. In FIG. 4(b), the transmittance at this time is indicated at $Tl_1$-ON. The mode here is the second mode because the liquid crystal layer does not use birefringence.

As described above, when the voltage applied to the ferroelectric liquid crystal 10 is increased (above the voltage $V_1$ at which the transmittance begins to increase) to the voltage $V_2$ (positive threshold) at which the increase of the transmittance reaches saturation, the ferroelectric liquid crystal 10 thereafter maintains the first ferroelectric state even after the applied voltage is removed (that is, 0 V is applied), and thus the liquid crystal panel 20 maintains the bright display state. Likewise, when the voltage applied to the ferroelectric liquid crystal 10 is decreased (below the voltage $V_3$ at which the transmittance begins to decrease) to the voltage $V_4$ (negative threshold) at which the decrease of the transmittance reaches saturation, the ferroelectric liquid crystal 10 thereafter maintains the second ferroelectric state even after the applied voltage is removed (that is, 0 V is applied) and, thus, the dark display state is maintained.

As can be seen from FIGS. 4(a) and 4(b), in the liquid crystal panel 20 according to the first embodiment, when the auxiliary light source 60 is switched on and off, the dark display becomes reversed even when the ferroelectric liquid crystal 10 is in the same ferroelectric state. In view of this, in the present embodiment, control is performed to reverse the polarity of the ferroelectric liquid crystal 10 (from one ferroelectric state to the other ferroelectric state) in synchronism with the on/off operation of the auxiliary light source 60, thereby performing control so that the dark display state of the liquid crystal panel will not be reversed.

Here, in the case of a display produced utilizing birefringence, the display is sensitive to variations in the microscopic gap between the substrates of the liquid crystal panel 20, and unevenness in display can easily occur. That is, as the gap between the substrates (the first and second glass substrates 11a and 11b) cannot be made perfectly uniform throughout the entire structure of the liquid crystal panel 20, the birefringence does not occur perfectly uniformly throughout the liquid crystal panel 20. If the birefringence is not uniform, the display color does not become perfectly uniform across the liquid crystal panel 20, resulting in unevenness in display. For example, in the dark display state ($Tl_1$-OFF) of the liquid crystal panel 20 achieved by turning off the auxiliary light source 60 and putting the ferroelectric liquid crystal 10 in the first stable state, the birefringence of the ferroelectric liquid crystal 10 is used as earlier described; as a result, when the background is displayed in black (see the liquid crystal panel 20 shown in FIG. 6(b)), the unevenness becomes pronounced, degrading the display quality. On the other hand, in the bright display state ($Th_1$-OFF) of the liquid crystal panel 20 achieved by turning off the auxiliary light source 60 and putting the ferroelectric liquid crystal 10 in the second stable state, as the birefringence of the ferroelectric liquid crystal 10 is not used as earlier described, an unevenness in the display does not occur.

That is, when the transmission axis ($a_1$) of the polarizer 15 and the transmission axis ($b_1$) of the reflective polarizer 16 are arranged at right angles to each other, and the ferroelectric liquid crystal 10 is set so that the long axes of the liquid crystal molecules in the second stable state align in parallel to the transmission axis ($a_1$) of the polarizer 15 and so that black characters are displayed on a white background (see the liquid crystal panels 20 shown in FIGS. 5(a) and 6(a)), a good display free from unevenness can be produced. In this case, the white background can be displayed without utilizing birefringence. In other words, it is important that birefringence is not used when displaying the background in white. In this way, as the liquid crystal panel 20 according to the first embodiment can produce a good bright display free from unevenness with the auxiliary light source 60 turned off, the liquid crystal panel 20 is suitable for applications where the display is normally produced in the reflective mode that does not use the auxiliary light source 60.

That is, as the liquid crystal panel 20 according to the first embodiment can produce a very clean bright display (free from unevenness occurring due to the birefringence) with the auxiliary light source 60 turned off, the liquid crystal panel 20 is suitable for applications such as watch displays where a white background is displayed with the auxiliary light source 60 turned off. The reason that the auxiliary light source 60 is normally turned off in wrist watches, etc. is to reduce power consumption.

FIG. 5 shows an example in which the liquid crystal panel 20 according to the first embodiment is used in a wrist watch.

FIG. 5(a) shows the case in which the liquid crystal panel 20 in the watch 1 produces a display without using the auxiliary light source 60 but by using ambient light. When, in a low ambient light environment, the user turns on the auxiliary light source switch 62 provided on the watch 1, the auxiliary light source 60 mounted behind the liquid crystal panel 20 in FIG. 5(a) turns on.

As earlier described, if the auxiliary light source 60 were simply turned on, the dark display would be reversed, and the display would appear as shown in FIG. 5(b). To address this, in the watch 1, when the auxiliary light source switch 62 is turned on, the ON state is detected by the control section 21. Then, the control section 21 controls the drive voltage waveform control circuit 22 to reverse the polarity of the ferroelectric liquid crystal 10 (from one ferroelectric state to the other ferroelectric state) in portions corresponding to the respective pixels in the liquid crystal panel 20 so that the display is produced on the liquid crystal panel 20 as shown in FIG. 5(a).

As earlier described, the white background display when the auxiliary light source 60 is turned off ($Tl_1$-OFF in FIG. 4(a)) is free from unevenness occurring due to the nonuniformity of birefringence, because the display is produced without using the birefringence.

Here, it is to be noted that, in the dark display produced on the liquid crystal panel 20 by switching the ferroelectric liquid crystal 10 to the first stable state with the auxiliary light source 60 turned off ($Tl_1$-OFF), the transmittance is somewhat high (that is, the dark display appears grayish) compared with the dark display produced on the liquid crystal panel 20 by switching the ferroelectric liquid crystal 10 to the second stable state with the auxiliary light source 60 turned on ($Tl_1$-ON). This is because the dark display produced on the liquid crystal panel 20 by switching the ferroelectric liquid crystal 10 to the first stable state with the auxiliary light source 60 turned off utilizes the birefringence of the ferroelectric liquid crystal 10 and, consequently, some of the ambient light A is not corrected so as to have a plane of vibration substantially parallel to the transmission axis ($b_1$) of the reflective polarizer 16 and such uncorrected light is reflected by the reflective polarizer 16 and leaks out of the liquid crystal panel 20, resulting in an increase in transmittance.

On the other hand, in the bright display produced on the liquid crystal panel 20 by switching the ferroelectric liquid crystal 10 to the first stable state with the auxiliary light source 60 turned on ($Th_1$-ON), the transmittance is somewhat low (that is, the bright display appears grayish) compared with the bright display produced on the liquid crystal panel 20 by switching the ferroelectric liquid crystal 10 to the second stable state with the auxiliary light source 60 turned off ($Th_1$-

OFF). This is because the bright display produced on the liquid crystal panel 20 by switching the ferroelectric liquid crystal 10 to the first stable state with the auxiliary light source 60 turned on utilizes the birefringence of the ferroelectric liquid crystal 10 and, consequently, some of the light B is not corrected so as to have a plane of vibration substantially parallel to the transmission axis ($a_1$) of the polarizer 15 and such uncorrected light is absorbed by the polarizer 15, resulting in an decrease in transmittance.

In this way, as the liquid crystal panel 20 according to the first embodiment can produce a very clean dark display with the auxiliary light source 60 turned on (a dark display with nearly zero transmittance can be achieved), the liquid crystal panel 20 is also suitable for applications such as displays for mobilephones where the display is normally produced in the transmissive mode by using the auxiliary light source 60.

FIG. 6 shows an example in which the liquid crystal panel 20 according to the first embodiment is used in a mobilephone.

FIG. 6(a) shows the case in which the liquid crystal panel 20 in the mobilephone 2 produces a display by using the auxiliary light source 60. To conserve power, the auxiliary light source 60 is turned off in such cases where the mobilephone is not operated for a predetermined length of time. However, when the user turns on the auxiliary light source switch 62 provided on the mobilephone 2, the auxiliary light source 60 mounted behind the liquid crystal panel 20 in FIG. 6(a) turns on.

As earlier described, if the auxiliary light source 60 were simply turned on, the dark display would be reversed, and the display would appear as shown in FIG. 6(b). To address this, in the mobilephone 2, when the auxiliary light source switch 62 is turned on, the ON state is detected by the control section 21. Then, the control section 21 controls the drive voltage waveform control circuit 22 to reverse the polarity of the ferroelectric liquid crystal 10 in portions corresponding to the respective pixels in the liquid crystal panel 20 so that the display is produced on the liquid crystal panel 20 as shown in FIG. 6(a).

As earlier noted, in the dark display produced with the auxiliary light source 60 turned off (the first stable state in FIG. 6(a)), the transmittance of light somewhat increases compared with the dark display produced with the auxiliary light source 60 turned on (the first stable state in FIG. 6(b)). However, this is not much of a problem because the mobilephone is usually used with the auxiliary light source 60 turned on.

FIG. 7 shows one example of the drive voltage waveform for driving the liquid crystal panel 20.

FIG. 7(a) shows one example of the scanning voltage waveform applied to a selected one of the scanning electrodes 13a, FIG. 7(b) shows one example of the signal voltage waveform applied to a selected one of the signal electrodes 13b and FIG. 7(c) shows a sum voltage waveform representing the sum of (a) and (b).

FIG. 7 shows the drive voltage waveform for two frames; in the figure, "ON" indicates the bright display state with the auxiliary light source turned off as shown in FIG. 4(a), while "OFF" indicates the dark display state likewise produced as shown in FIG. 4(a). Here, one scanning period is used to produce a display based on display data for one frame. One frame comprises a reset period (Rs) and a scanning period, and one scanning period comprises a selection period (Se) and a non-selection period (NSe).

During the reset period (Rs), the ferroelectric liquid crystal 10, irrespective of its immediately preceding display state, is forcefully reset to the first stable state for the bright display (transmission state) in the first half of the period, and to the second stable state for the dark display (non-transmission state) in the second half of the period. In the first half of the reset period (Rs), +20 V is applied and, in the second half, −20 V is applied as the scanning voltage waveform (a). On the other hand, the signal voltage waveform (b) alternates between +5 V and −5 V at predetermined intervals of time. As a result, a voltage proportional to the sum voltage waveform (c) is applied to the corresponding pixel in the ferroelectric liquid crystal 10; that is, in the first half of the reset period (Rs), a voltage greater in magnitude than the positive threshold $V_2$ (see FIG. 4(a)) is applied to reset the pixel to the first stable state and, in the second half, a voltage greater in magnitude than the negative threshold $V_4$ (see FIG. 4(a)) is applied to reset the pixel to the second stable state. By thus providing the reset period, the liquid crystal panel using the ferroelectric liquid crystal can continue to produce a good display.

When the drive voltage shown in FIG. 7 is applied with the auxiliary light source 60 turned off, in the first frame the liquid crystal is set to the first stable state to produce the bright display and, in the second frame, it is set to the second stable state to produce the dark display.

A second embodiment will be described.

The cross-sectional structure of the liquid crystal panel 20 according to the second embodiment and the structure of the auxiliary light source 60 are the same as those shown in FIG. 2, and a description thereof will not be repeated here.

In the second embodiment also, "FELIX 501" manufactured by Clariant is used as the ferroelectric liquid crystal 10. Further, in the second embodiment also, the gap between the first and second transparent glass substrates 11a and 11b is set to approximately 1.7 µm.

FIG. 8 shows the arrangement of the polarizer 15 and the reflective polarizer 16 in the liquid crystal panel 20 according to the second embodiment.

As shown in FIG. 8, the transmission axis ($a_2$) of the polarizer 15 is oriented in parallel to the transmission axis ($b_2$) of the reflective polarizer 16. In FIG. 8, the ferroelectric liquid crystal 10 is arranged so that, in the second stable state, the long axes of the liquid crystal molecules align in parallel to the transmission axis ($a_2$) of the polarizer 15. Further, as shown in FIG. 8, in the first stable state of the ferroelectric liquid crystal 10, the long axis of each liquid crystal molecule is tilted by a cone angle $\theta_2$ relative to the long axis of each liquid crystal molecule of the ferroelectric liquid crystal 10 in the second stable state; that is, the long axis rotates around a liquid crystal cone to a position different to that in the second stable state.

In the example of the ferroelectric liquid crystal 10 according to the second embodiment, the cone angle ($\theta_2$) is not equal to 45°. As shown by the previously given equation (1), when birefringence is used, $I_{out}$ does not become equal to $I_{in}$ because of the attenuation due to the retardation coupled with the attenuation due to the cone angle ($\theta_2$) which is not equal to 45°.

FIG. 9 shows the relationship between the transmittance of light and the polarity of the voltage applied to the ferroelectric liquid crystal 10 in the liquid crystal panel 20 according to the second embodiment.

Figure 9A:
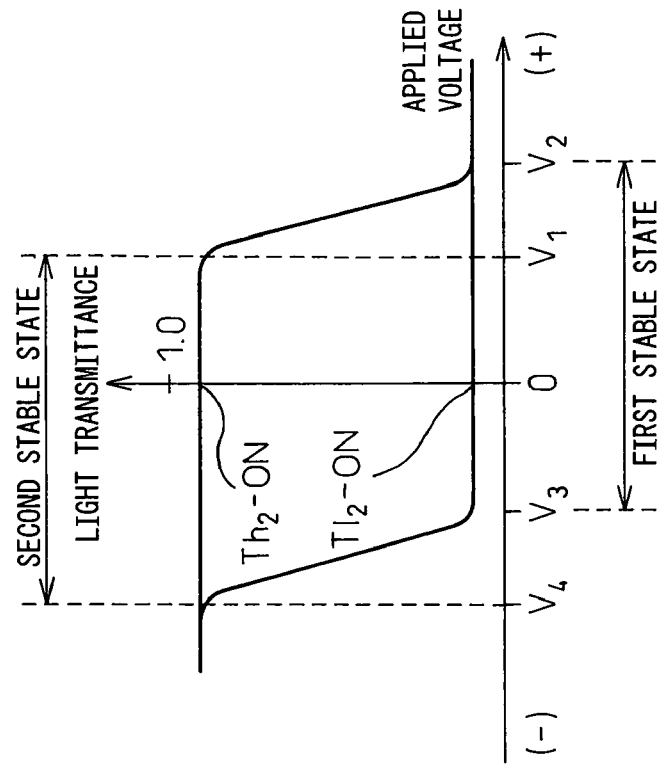
FIG. 9(a) is a diagram showing the relationship between the transmittance of light and the voltage applied to the liquid crystal panel according to the second embodiment for the case in which the auxiliary light source is turned off.
Figure 9B:
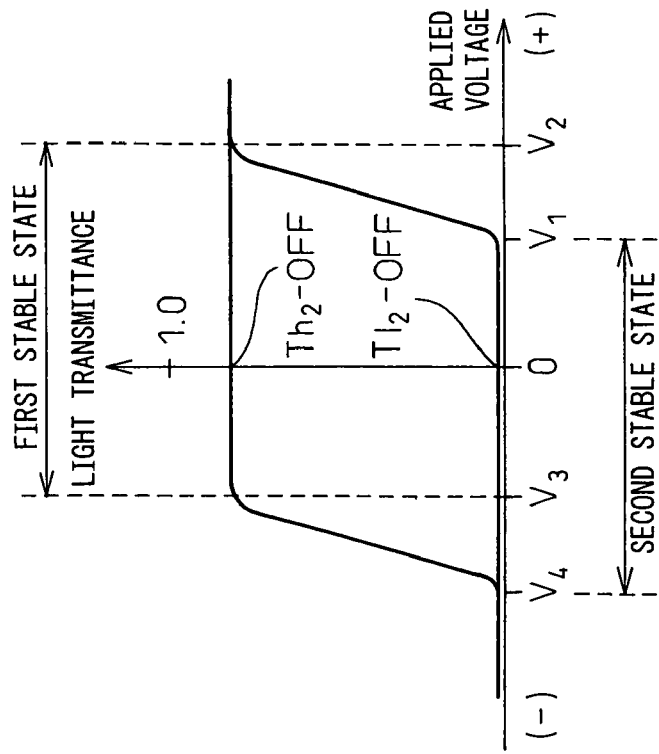

FIG. 9(a) shows the graph for the case in which the auxiliary light source 60 is turned off, while FIG. 9(b) shows the graph for the case in which the auxiliary light source 60 is turned on. In each graph, the horizontal axis represents the voltage (V) applied between the scanning electrode 13a and signal electrode 13b in the liquid crystal panel 20 with the scanning electrode 13a as the reference (that is, the voltage applied across the ferroelectric liquid crystal 10), and the vertical axis represents the transmittance of the liquid crystal panel 20.

Referring to FIG. 9(a), a description will be given for the case in which the auxiliary light source 60 is turned off.

When the ferroelectric liquid crystal 10 is switched to the first stable state by reversing the polarity of the applied voltage, the orientation direction of the long axes of the liquid crystal molecules in the ferroelectric liquid crystal 10 becomes displaced from both the transmission axis ($a_2$) of the polarizer 15 and the transmission axis ($b_2$) of the reflective polarizer 16. Light A vibrating in a plane parallel to the transmission axis ($a_2$) of the polarizer 15 enters the liquid crystal panel 20 from the viewer side, where, due to the birefringence of the ferroelectric liquid crystal 10, the plane of vibration is rotated so as to become perpendicular to the transmission axis ($b_2$) of the reflective polarizer 16, so that the light is reflected by the reflection axis of the reflective polarizer 16. Accordingly, when the auxiliary light source 60 is turned off, in the first stable state the light A entering the liquid crystal panel 20 from the viewer side and returned by reflection is observed on the liquid crystal panel 20 which thus produces a bright display. In FIG. 9(a), the transmittance at this time is indicated at $Th_2$-OFF. The mode in which the polarization direction of the incident light is changed by using birefringence will be referred to as a first mode. In the present embodiment, the apparatus operates in the first mode when the ferroelectric liquid crystal exhibits the first stable state.

When the ferroelectric liquid crystal 10 is switched to the second stable state by reversing the polarity of the applied voltage, the long axes of the liquid crystal molecules in the ferroelectric liquid crystal 10 align in parallel to the transmission axis ($a_2$) of the polarizer 15; as a result, the light A vibrating in a plane parallel to the transmission axis ($a_2$) and entering the liquid crystal panel 20 from the viewer side has a plane of vibration parallel to the transmission axis ($b_2$) of the reflective polarizer 16, and thus passes through the reflective polarizer 16. Accordingly, when the auxiliary light source 60 is turned off, in the second stable state the ambient light A passes through the polarizer 15 and enters the liquid crystal panel 20, and the surface of the auxiliary light source 60 is observed by that light, thus producing a dark (black) display on the liquid crystal panel 20. In FIG. 9(a), the transmittance at this time is indicated at $Tl_2$-OFF. The mode that does not utilize birefringence and therefore does not cause the polarization direction of the incident light to change will be referred to as a second mode. In the present embodiment, the apparatus operates in the second mode when the ferroelectric liquid crystal exhibits the second stable state.

As described above, when the voltage applied to the ferroelectric liquid crystal 10 is increased (above the voltage $V_1$ at which the transmittance begins to increase) to the voltage $V_2$ (positive threshold) at which the increase of the transmittance reaches saturation, the ferroelectric liquid crystal 10 thereafter maintains the first stable state even after the applied voltage is removed (that is, 0 V is applied) and, thus, the liquid crystal panel 20 maintains the bright (white) display state. Likewise, when the voltage applied to the ferroelectric liquid crystal 10 is decreased (below the voltage $V_3$ at which the transmittance begins to decrease) to the voltage $V_4$ (negative threshold) at which the decrease of the transmittance reaches saturation, the ferroelectric liquid crystal 10 thereafter maintains the second stable state even after the applied voltage is removed (that is, 0 V is applied) and, thus, the liquid crystal panel 20 maintains the dark (black) display state.

Referring to FIG. 9(b), a description will be given for the case in which the auxiliary light source 60 is turned on.

When the ferroelectric liquid crystal 10 is switched to the first stable state by reversing the polarity of the applied voltage, the orientation direction of the long axes of the liquid crystal molecules in the ferroelectric liquid crystal 10 becomes displaced from both the transmission axis ($a_2$) of the polarizer 15 and the transmission axis ($b_2$) of the reflective polarizer 16. That is, the orientation direction of the long axes of the liquid crystal molecules in the ferroelectric liquid crystal 10 is tilted at an angle $\theta_2$ relative to the transmission axis ($a_2$). Light B emitted from the auxiliary light source 60 and vibrating in a plane parallel to the transmission axis ($b_2$) of the reflective polarizer 16 enters the liquid crystal panel 20 where, due to the birefringence of the ferroelectric liquid crystal 10, the plane of vibration is rotated so as to become perpendicular to the transmission axis ($a_2$) of the polarizer 15, and the light is thus absorbed by the polarizer 15. Accordingly, when the auxiliary light source 60 is turned on, in the first stable state the liquid crystal panel 20 produces a dark (black) display. In FIG. 9(b), the transmittance at this time is indicated at $Tl_2$-ON. In this case, the liquid crystal layer is in the first mode, because birefringence is used.

When the ferroelectric liquid crystal 10 is switched to the second stable state by reversing the polarity of the applied voltage, the long axes of the liquid crystal molecules in the ferroelectric liquid crystal 10 align in parallel to the transmission axis ($b_2$) of the reflective polarizer 16. The light B emitted from the auxiliary light source 60 and vibrating in a plane parallel to the transmission axis ($b_2$) of the reflective polarizer 16, thus entering the liquid crystal panel 20, has a plane of vibration parallel to the transmission axis ($a_2$) of the polarizer 15, and thus passes through the polarizer 15 (transmissive state). Accordingly, when the auxiliary light source 60 is turned on, in the second stable state a bright (white) display is produced on the liquid crystal panel 20 by the light B passed through the liquid crystal panel 20. In FIG. 9(b), the transmittance at this time is indicated at $Th_2$-ON. In this case, the liquid crystal layer is in the second mode, because birefringence is not used.

As described above, in the case in which the auxiliary light source 60 is turned on, when the voltage applied to the ferroelectric liquid crystal 10 is increased (above the voltage $V_1$ at which the transmittance begins to increase) to the voltage $V_2$ (positive threshold) at which the increase of the transmittance reaches saturation, the ferroelectric liquid crystal 10 thereafter maintains the first stable state even after the applied voltage is removed (that is, 0 V is applied) and, thus, the liquid crystal panel 20 maintains the dark display state. On the other hand, when the voltage applied to the ferroelectric liquid crystal 10 is decreased (below the voltage $V_3$ at which the transmittance begins to decrease) to the voltage $V_4$ (negative threshold) at which the decrease of the transmittance reaches saturation, the ferroelectric liquid crystal 10 thereafter maintains the second stable state even after the applied voltage is removed (that is, 0 V is applied), and thus the liquid crystal panel 20 maintains the bright display state.

As can be seen from FIGS. 9(a) and 9(b), in the liquid crystal panel 20 according to the second embodiment, when the auxiliary light source 60 is switched between on and off, the dark display becomes reversed even when the ferroelectric liquid crystal 10 is in the same stable state.

In the case of a display produced utilizing birefringence, the display is sensitive to variations in the microscopic gap between the substrates of the liquid crystal panel 20, and an unevenness in the display can easily occur. That is, as the gap between the substrates (the first and second glass substrates 11a and 11b) cannot be made perfectly uniform throughout the entire structure of the liquid crystal panel 20, the birefringence does not occur perfectly uniformly throughout the liquid crystal panel 20. If the birefringence is not uniform, the display color does not become perfectly uniform across the liquid crystal panel 20, resulting in an unevenness in the display. For example, in the dark display state ($Tl_2$-ON) of the liquid crystal panel 20 achieved by turning on the auxiliary light source 60 and putting the ferroelectric liquid crystal 10 in the first stable state, the birefringence of the ferroelectric liquid crystal 10 is used as earlier described; as a result, when the background is displayed in black (see the liquid crystal panel 20 shown in FIG. 6(b)), the unevenness becomes pronounced, degrading the display quality. On the other hand, in the bright display state ($Th_2$-ON) of the liquid crystal panel 20 achieved by turning on the auxiliary light source 60 and putting the ferroelectric liquid crystal 10 in the second stable state, as birefringence of the ferroelectric liquid crystal 10 is not used, as earlier described, the unevenness in display does not occur.

That is, when the transmission axis ($a_2$) of the polarizer 15 and the transmission axis ($b_2$) of the reflective polarizer 16 are arranged parallel to each other, and the ferroelectric liquid crystal 10 is set so that the long axes of the liquid crystal molecules in the second stable state align in parallel to the transmission axis ($a_2$) of the polarizer 15 and so that black characters are displayed on a white background (see the liquid crystal panels 20 shown in FIGS. 5(a) and 6(a)), a good display free from unevenness can be produced. In this case, the white background can be displayed without utilizing birefringence. In other words, it is important that birefringence is not used when displaying the background in white. In this way, as the liquid crystal panel 20 according to the second embodiment can produce a good bright display free from unevenness with the auxiliary light source 60 turned on, the liquid crystal panel 20 is also suitable for applications where the display is normally produced in the transmissive mode that uses the auxiliary light source 60.

That is, as the liquid crystal panel 20 according to the second embodiment can produce a very clean bright display (free from unevenness occurring due to the birefringence) with the auxiliary light source 60 turned on, the liquid crystal panel 20 is suitable for applications such as displays of mobilephones where a white background is displayed with the auxiliary light source 60 turned on (see FIG. 6).

Here, it is to be noted that, in the dark display produced on the liquid crystal panel 20 by switching the ferroelectric liquid crystal 10 to the first stable state with the auxiliary light source 60 turned on according to the second embodiment ($Tl_2$-ON in FIG. 9(b)), the transmittance is higher (that is, the dark display appears more grayish) than in the dark display produced on the liquid crystal panel 20 by switching the ferroelectric liquid crystal 10 to the first stable state with the auxiliary light source 60 turned off according to the first embodiment ($Tl_1$-OFF in FIG. 4(a)). This is because the dark display produced on the liquid crystal panel 20 by switching the ferroelectric liquid crystal 10 to the first stable state with the auxiliary light source 60 turned on according to the second embodiment utilizes the birefringence of the ferroelectric liquid crystal 10. In the second embodiment, as the cone angle is not set equal to 45°, as earlier stated, the amount of ambient light A not corrected so as to have a plane of vibration substantially parallel to the reflection axis of the reflective polarizer 16 increases, and such uncorrected light is reflected by the reflective polarizer 16, resulting in an increase in transmittance.

On the other hand, in the bright display produced on the liquid crystal panel 20 by switching the ferroelectric liquid crystal 10 to the first stable state with the auxiliary light source 60 turned off according to the second embodiment ($Th_2$-OFF in FIG. 9(a)), the transmittance is lower (that is, the bright display appears more grayish) than in the bright display produced on the liquid crystal panel 20 by switching the ferroelectric liquid crystal 10 to the first stable state with the auxiliary light source 60 turned on according to the first embodiment ($Th_1$-ON in FIG. 4(b)). This is because the bright display produced on the liquid crystal panel 20 by switching the ferroelectric liquid crystal 10 to the first stable state with the auxiliary light source 60 turned off according to the second embodiment utilizes the birefringence of the ferroelectric liquid crystal 10. In the second embodiment, as the cone angle is not set equal to 45°, as earlier stated, the amount of light B not corrected so as to have a plane of vibration substantially parallel to the reflection axis of the reflective polarizer 16 increases, and such uncorrected light is not reflected by the reflection axis, resulting in a decrease in transmittance.

However, as the liquid crystal panel 20 according to the second embodiment can produce a very clean dark display ($Tl_2$-OFF in FIG. 9(a)) with the auxiliary light source 60 turned off (a dark display with nearly zero transmittance can be achieved), the liquid crystal panel 20 is suitable for applications such as watch displays where the contrast is important and where the display is normally produced in the reflective mode that does not use the auxiliary light source 60.

Accordingly, the liquid crystal panel 20 according to the second embodiment can be used in the mobilephone 2 shown in FIG. 6(a) in a manner similar to that of the first embodiment. In the second embodiment also, as in the first embodiment, if the auxiliary light source 60 were simply turned on, the dark display would be reversed, and the display would appear as shown in FIG. 6(b); accordingly, control may also be performed in this embodiment so that, when the auxiliary light source switch 62 is turned on, the ON state is detected by the control section 21 which then controls the drive voltage waveform control circuit 22 to reverse the polarity of the ferroelectric liquid crystal 10 in portions corresponding to the respective pixels in the liquid crystal panel 20 and to produce the display on the liquid crystal panel 20 as shown in FIG. 6(a).

As earlier described, in the dark display produced with the auxiliary light source 60 turned on ($Tl_2$-ON in FIG. 9(b)), the transmittance further increases compared with the dark display produced with the auxiliary light source 60 turned off ($Tl_2$-OFF in FIG. 9(a)), but this is not much of a problem because the watch is usually used with the auxiliary light source 60 turned off.

The drive voltage waveform for driving the liquid crystal panel 20 according to the second embodiment is the same as that shown in FIG. 7 in connection with the first embodiment, and therefore, the description thereof will not be repeated here.

In the first and second embodiments described above, when the liquid crystal panel 20 is driven in the transmissive mode, the dark surface color of the auxiliary light source 60 is observed on the liquid crystal panel 20. Here, a light absorbing layer may be provided between the reflective polarizer 16 and the auxiliary light source 60. By providing the light absorbing layer, the surface color of the auxiliary light source 60 to be observed on the liquid crystal panel 20 can be displayed darker.

Further, in the first and second embodiments, it is preferable to form numerous microscopic openings in the surface of the light absorbing layer so as to absorb light in a certain spectral region and so as not to attenuate the light B emitted from the auxiliary light source 60 when the liquid crystal panel 20 is driven in the transmissive mode with the auxiliary light source 60 turned on. In this case, as the light B emitted from the auxiliary light source 60 passes through the numerous microscopic openings formed in the surface of the light absorbing layer, the provision of the light absorbing layer does not substantially influence the amount of light observed on the liquid crystal panel 20. The opening ratio of the light absorbing layer due to the provision of the microscopic openings can be appropriately chosen from the range of 30% to 70%. Further, the microscopic openings may be formed as tiny circular holes or in a grating-like pattern. The microscopic openings need not necessarily be formed in a periodically repeating pattern but may be formed randomly.

In the first and second embodiments, a reflective layer for reflecting a portion of the light in the visible region may be provided on the light-emitting side of the auxiliary light source 60. Here, the reflective layer may be formed as a layer for reflecting certain wavelengths within the visible region and thus reflecting light of a particular color, or as a semi-transmissive, semi-reflective layer for reflecting part of light in the entire range of the visible region while transmitting the remaining part of the light. For example, if a reflective layer for reflecting blue light is provided, the reflected light from the auxiliary light source 60 can be observed as blue-colored light on the liquid crystal panel 20 when the liquid crystal panel 20 is driven in the transmissive mode. That is, the display color when the liquid crystal panel 20 is driven in the transmissive mode can be changed in this way.

Further, in the first and second embodiments, the polarity of the ferroelectric liquid crystal 10 is reversed by the control section 21 controlling the drive voltage waveform control circuit 22, the scan drive voltage waveform generating circuit 23, and the signal drive voltage waveform generating circuit 24; that is, negative/positive reversal display data, created by reversing the negative and positive of the normal display data, is prestored in the display data storage section 27 and, using the prestored negative/positive reversal display data, control is performed so that the polarities of the drive waveforms to be applied to the scanning electrode and the signal electrode are reversed from the previous drive waveforms. However, instead of using such display data, the polarity of the ferroelectric liquid crystal 10 may be reversed by reversing the polarity of the voltage supplied from the power supply section 25 to the liquid crystal panel 20. In that case, the control section 21 may use a suitable electronic circuit for reversing the voltage polarity.

A third embodiment will be described.

The third embodiment will be described with reference to FIG. 2. Substantially the same structure as that shown in FIG. 2 can be used in the third embodiment. However, the scanning electrodes 13a and the signal electrodes 13b are coated with polymeric alignment films 14a and 14b, respectively, treated for vertical alignment. Further, MLC-6883 (manufactured by Merck), a liquid crystal material having a negative dielectric anisotropy, is used as a liquid crystal 110 which is a vertically aligned (homeotropically aligned) liquid crystal. The liquid crystal 110 sandwiched between the first and second transparent glass substrates 11a and 11b is about 1.7 µm in thickness.

In FIG. 2, arrow A indicates ambient light incident on the liquid crystal panel of the third embodiment from the outside, and arrow B shows light incident on the liquid crystal panel of the third embodiment from the auxiliary light source 60.

Figure 10:
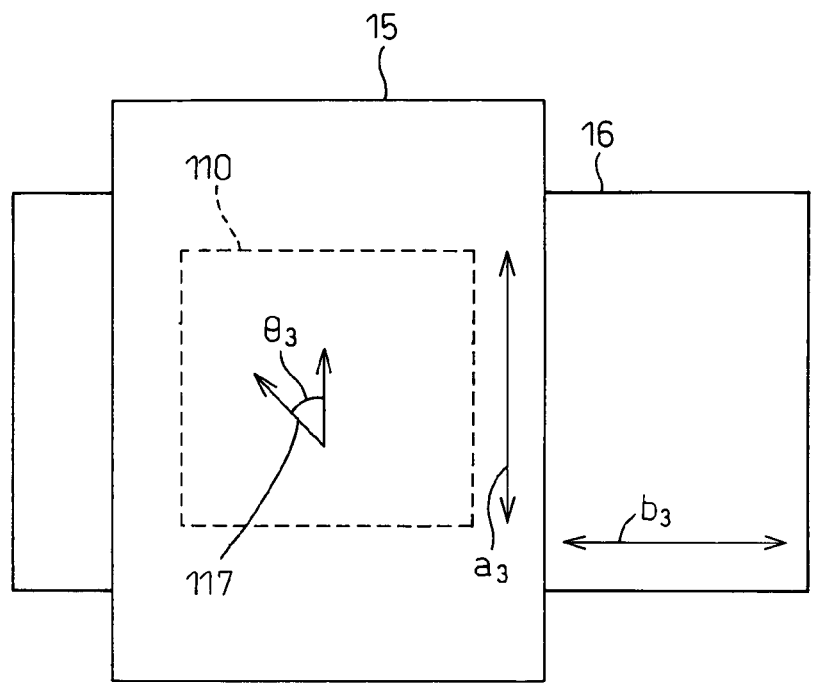
FIG. 10 is a diagram showing the relationship between the polarizer and the reflective polarizer in the liquid crystal panel according to a third embodiment.

FIG. 10 shows the arrangement of the polarizer 15 and the reflective polarizer 16 in the liquid crystal panel according to the third embodiment.

As shown in FIG. 10, the transmission axis ($a_3$) of the polarizer 15 is oriented at right angles to the transmission axis ($b_3$) of the reflective polarizer 16. In FIG. 10, arrow 117 indicates the alignment direction of the alignment film, and $\theta_3$ represents the angle that the alignment direction of the alignment film makes with the transmission axis ($a_3$) of the polarizer 15. In the present embodiment, $\theta_3$ is chosen to be approximately 45 degrees. However, $\theta_3$ need not be limited to 45 degrees, but may be set to any other suitable angle and, for example, to 40 degrees.

Figure 11:
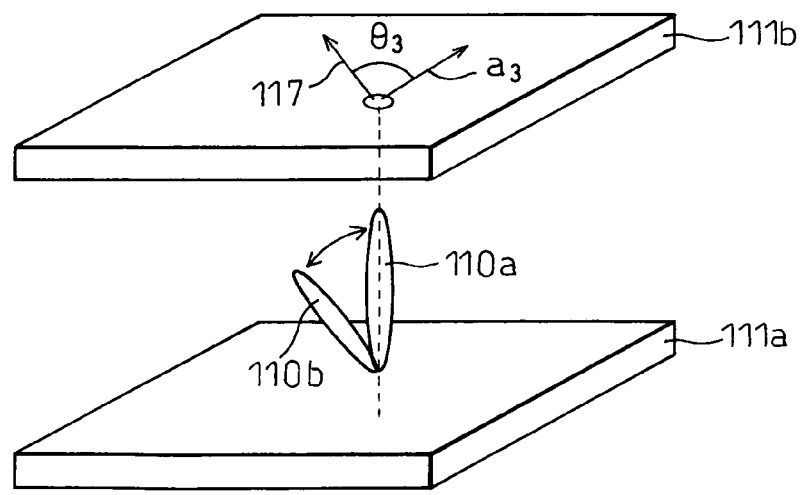
FIG. 11 is a diagram for explaining the behavior of a liquid crystal molecule.

FIG. 11 illustrates the behavior of a liquid crystal molecule in the vertically aligned (homeotropically aligned) liquid crystal 110.

When no voltage is applied to the liquid crystal panel of the third embodiment, the long axis (see 110a) of the liquid crystal molecule in the vertically aligned (homeotropically aligned) liquid crystal 110 stands substantially vertically between the first and second transparent glass substrates 111a and 111b. When a voltage is applied to the liquid crystal panel 120, the long axis (see 110b) of the liquid crystal molecule in the vertically aligned (homeotropically aligned) liquid crystal 110 tilts so as to point in the direction shown by the arrow 117.

Next, a description will be given for the case in which the auxiliary light source 60 is turned off.

When no voltage is applied to the liquid crystal panel of the third embodiment, the ambient light A entering through the polarizer 15 passes unaltered through the liquid crystal 110. As the light passed through the liquid crystal 110 is polarized at right angles to the transmission axis ($b_3$) of the reflective polarizer 16, the light passed through the liquid crystal 110 is reflected by the reflection axis of the reflective polarizer 16. Accordingly, in this case, the liquid crystal panel of the third embodiment produces a bright display. In this case, the liquid crystal layer is in the second mode, because birefringence is not used.

When a voltage is applied to the liquid crystal panel of the third embodiment, the polarization direction of the ambient light A entering through the polarizer 15 is rotated about 90 degrees as it passes through the liquid crystal 110, due to the birefringence effect of the liquid crystal molecule 110b tilted in the direction shown by the arrow 117. Therefore, the light passed through the liquid crystal 110 is polarized substantially parallel to the transmission axis ($b_3$) of the reflective polarizer 16, so that the light passes through the reflective polarizer 16 and is reflected by the auxiliary light source 60. Accordingly, in this case, the liquid crystal panel of the third embodiment produces a dark display as the color of the auxiliary light source 60 is observed thereon. In this case, the liquid crystal layer is in the first mode, because birefringence is used.

Next, a description will be given for the case in which the auxiliary light source 60 is turned on.

When no voltage is applied to the liquid crystal panel of the third embodiment, the light B of the auxiliary light source 60 entering through the reflective polarizer 16 passes unaltered through the liquid crystal 110. As the light passed through the liquid crystal 110 is polarized at right angles to the transmission axis ($a_3$) of the polarizer 15, the light passed through the liquid crystal 110 is absorbed by the polarizer 15. Accordingly, in this case, the liquid crystal panel 120 produces a dark display. In this case, the liquid crystal layer is in the second mode, because birefringence is not used.

When a voltage is applied to the liquid crystal panel of the third embodiment, the polarization direction of the light B of the auxiliary light source 60 entering through the reflective polarizer 16 is rotated about 90 degrees as it passes through the liquid crystal 110, due to the birefringence effect of the liquid crystal molecule 110b tilted in the direction shown by the arrow 117. Therefore, the light passed through the liquid crystal 110 has a component polarized substantially parallel to the transmission axis ($a_3$) of the polarizer 15, and thus passes through the polarizer 15. Accordingly, in this case, the liquid crystal panel of the third embodiment produces a bright display. In this case, the liquid crystal layer is in the first mode, because birefringence is used.

In the case of a display produced utilizing birefringence, the display is sensitive to variations in the microscopic gap between the substrates of the liquid crystal panel 120, and an unevenness in the display can easily occur. That is, as the gap between the substrates (the first and second glass substrates 111a and 111b) cannot be made perfectly uniform throughout the entire structure of the liquid crystal panel 120, the birefringence is not perfectly uniform throughout the liquid crystal panel 120. If the birefringence is not uniform, the display color does not become perfectly uniform across the liquid crystal panel 120, resulting in an unevenness in the display. For example, when the auxiliary light source 60 is turned off, and no voltage is applied to the liquid crystal panel 120, the bright display produced on the liquid crystal panel 120 does not use birefringence and is therefore free from an unevenness in the display. That is, in this case, a white background can be displayed without utilizing birefringence. In other words, it is important that birefringence is not used when displaying a large-area background in white.

In this way, as the liquid crystal panel according to the third embodiment can produce a good bright display free from unevenness with the auxiliary light source 60 turned off, the liquid crystal panel is suitable for applications where the display is normally produced in the reflective mode that does not use the auxiliary light source 60. For example, it is suitable for applications such as watch displays where a white background is displayed with the auxiliary light source 60 turned off (see FIG. 5). The reason that the auxiliary light source 60 is normally turned off in wrist watches, etc. is to reduce the power consumption.

If a bright display free from unevenness is to be produced with the auxiliary light source turned on, the transmission axis ($a_3$) of the polarizer and the transmission axis ($b_3$) of the reflective polarizer should be arranged parallel to each other. With this arrangement, as the bright display can be produced in the second mode that does not use birefringence, a good bright (white) display can be obtained when displaying a large-area background in white. This arrangement is suitable for a display that normally uses the transmissive mode by turning on the auxiliary light source. For example, it is suitable for applications such as displays of mobilephones where a white background is displayed with the auxiliary light source 60 turned on (see FIG. 6).

What is claimed is:

1. A liquid crystal display apparatus comprising:
a first substrate;
a second substrate;
a reflective polarizer, mounted on said first substrate and having a first transmission axis and a first reflection axis at right angles to each other, for transmitting linearly polarized light vibrating in a plane parallel to said first transmission axis and for reflecting linearly polarized light vibrating in a plane parallel to said first reflection axis;
a polarizer, mounted on said second substrate and having a second transmission axis, for transmitting linearly polarized light vibrating in a plane parallel to said second transmission axis; and
a liquid crystal layer provided between said first and second substrates, and having a first mode which causes the direction of polarization of incident light to change by utilizing birefringence and a second mode which does not utilize birefringence and therefore does not cause the direction of polarization of incident light to change, wherein
said liquid crystal layer maintains first and second stable states in the absence of an applied voltage, and one of said first and second stable states is set as said second mode,
a display state is switched between a bright display state and a dark display state by applying a voltage to said liquid crystal layer, and
said bright display state is produced by driving said liquid crystal layer in said second mode.

2. The liquid crystal display apparatus according to claim 1, wherein said bright display state is produced by causing ambient light entering said liquid crystal layer through said second transmission axis of said polarizer to be reflected at said reflective polarizer and by allowing said reflected light to return through said liquid crystal layer and emerge from said polarizer.

3. The liquid crystal display apparatus according to claim 2, wherein said first transmission axis and said second transmission axis are arranged substantially at right angles to each other.

4. The liquid crystal display apparatus according to claim 1, wherein, in said second stable state, liquid crystal molecules are aligned in a direction substantially parallel to said second transmission axis.

5. The liquid crystal display apparatus according to claim 1, wherein, in said first stable state, liquid crystal molecules are aligned in a direction tilted at approximately 45 degrees from the direction in which said liquid crystal molecules are aligned in said second stable state.

6. The liquid crystal display apparatus according to claim 1, wherein said liquid crystal layer is a vertically aligned liquid crystal layer, and has a first state in which liquid crystal molecules are aligned substantially vertically between said first and second substrates and a second state in which said liquid crystal molecules are tilted at a prescribed angle with respect to said second transmission axis, and wherein said first state is set as said second mode.

7. The liquid crystal display apparatus according to claim 1, further comprising an auxiliary light source mounted outside said reflective polarizer, and
said liquid crystal layer is driven in said second mode with said auxiliary light source turned off.

8. The liquid crystal display apparatus according to claim 1, further comprising an auxiliary light source mounted outside said reflective polarizer, and
said liquid crystal layer is driven in said second mode with said auxiliary light source turned on.

9. The liquid crystal display apparatus according to claim 8, wherein said bright display state is produced by allowing light emitted from said auxiliary light source and entering said liquid crystal layer through said first transmission axis of said reflective polarizer to pass through said second transmission axis of said polarizer and emerge on a viewer side thereof.

10. The liquid crystal display apparatus according to claim 9, wherein said first transmission axis and said second transmission axis are arranged substantially parallel to each other.

11. The liquid crystal display apparatus according to claim 1, further comprising:

an auxiliary light source mounted outside said reflective polarizer; and a light absorbing layer, disposed between said reflective polarizer and said auxiliary light source, for absorbing light in a certain spectral region.

12. The liquid crystal display apparatus according to claim 1, further comprising:

an auxiliary light source mounted outside said reflective polarizer; and a light absorbing layer, disposed between said reflective polarizer and said auxiliary light source, for absorbing a portion of light in a visible region.

13. The liquid crystal display apparatus according to claim 1, further comprising an auxiliary light source mounted outside said reflective polarizer, wherein said auxiliary light source is provided with a reflective layer for reflecting a portion of light in a visible region.

* * * * *